(No Model.)
T. W. SYNNOTT.
GLASS FURNACE.
No. 329,970. Patented Nov. 10, 1885.
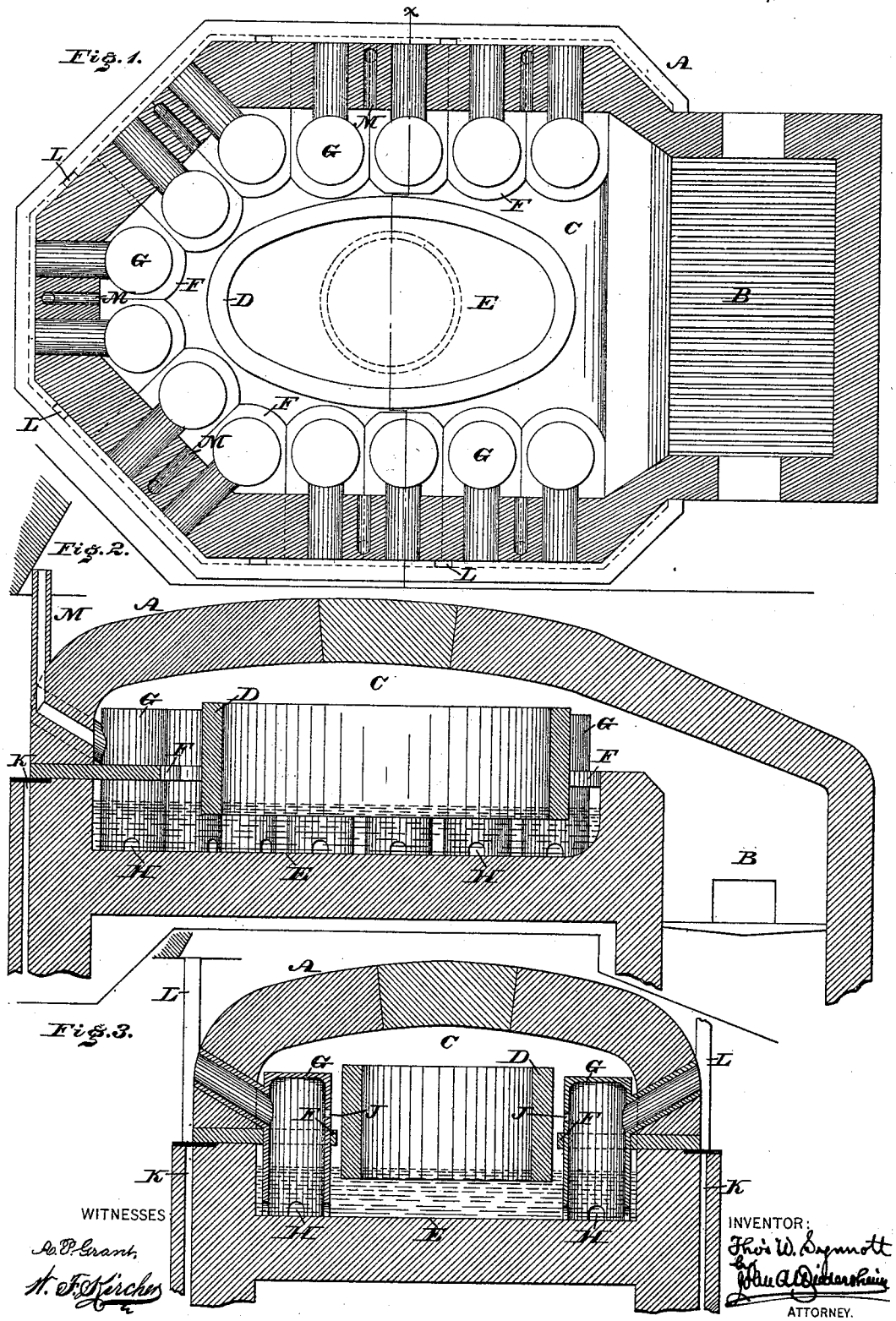
WITNESSES
INVENTOR:
ATTORNEY.

UNITED STATES PATENT OFFICE.

THOMAS W. SYNNOTT, OF WENONAH, ASSIGNOR TO WHITNEY BROTHERS, OF GLASSBOROUGH, NEW JERSEY.

GLASS-FURNACE.

SPECIFICATION forming part of Letters Patent No. 329,970, dated November 10, 1885.

Application filed March 31, 1885. Serial No. 160,761. (No model.)

*To all whom it may concern:*

Be it known that I, THOMAS W. SYNNOTT, a citizen of the United States, residing at Wenonah, in the county of Gloucester, in the State of New Jersey, have invented a new and useful Improvement in Glass-Furnaces, which improvement is fully set forth in the following specification and accompanying drawings, in which—

Figure 1 represents a horizontal section of a glass-furnace embodying my invention. Fig. 2 represents a vertical section thereof. Fig. 3 represents a transverse section in line $xx$, Fig. 1.

Similar letters of reference indicate corresponding parts in the several figures.

My invention consists of certain improvements in glass-furnaces, as follows: a floating batch-holder and peculiarly-constructed holders for the hoods or retorts which receive the glass.

Referring to the drawings, A represents the body of a glass-furnace, constructed of suitable material. B represents the fire-bed or combustion-chamber thereof. Within the glass-forming chamber C is a loose ring or band, D, which is of oval form, but may be cylindrical or other shape, if desired, the same primarily resting on the bed E of said chamber. To the inner walls of the body A, surrounding the sides and rear end of said ring D, is a ledge, F, having a series of openings, within which are fitted the hooks or retorts G, for receiving the glass as formed, said retorts having at bottom openings or ports H, whereby the glass is permitted to enter the same from below, said retorts having also tubes or mouths, whereby access is had to the interior of the same for the removal of the glass at the sides of the furnace, it being noticed that the retorts are firmly sustained in the ledge F, the latter providing simple and inexpensive means for said purpose.

The operation is as follows: The material to form the batch is placed in the ring D, and the same subjected to the fire from the chamber B. As the glass is formed on the bed E, it causes the flotation of the ring D, and the latter may be replenished with fresh material through an opening in the cap or top wall of the furnace, said opening being afterward suitably closed. The molten glass or metal passes through the openings H into the retorts G, and may be removed therefrom through the openings or mouths thereof. As the flame or products of combustion reach the chamber C, and consequently the batch in the ring D, the retorts are also subjected to the action of said flame or products, and thus maintained at a high temperature. As the floating ring receives the batch at or near the center of the tank, when fresh material is supplied to said ring, it is removed sufficiently from the metal not to affect the temperature thereof. The back of the retorts is provided with openings J, which are in line, or nearly so, with the outlets of said retorts, so that the ring and the interior of the furnace may be seen through the retorts.

An air-space, K, is provided around the outside of the furnace by building an outer wall, the object of which is to keep the heat from the workmen. The top of this air-space is properly covered, and has at intervals openings or ducts L, through which the heat is directed to the stack.

Proper ducts or flues, M, are provided around the outside of the tank for conveying the products of combustion to the stack, the flues being so located as to draw the heat from the combustion-chamber around the retorts.

Having thus described my invention, what I claim as new, and desire to secure by Letters Patent, is—

1. A glass-furnace provided with a floating batch-holding ring, substantially as described.

2. In a glass-furnace, a batch-holding ring and a series of retorts surrounding the same, substantially as described.

3. In a glass-furnace, a ledge within the glass-chamber, in combination with retorts supported on the said ledge in openings thereof, substantially as and for the purpose set forth.

4. In a glass-furnace, a retort having an opening on the side opposite to the mouth thereof, substantially as and for the purpose set forth.

5. The opening J in the retort, substantially as described.

6. A glass-furnace having an air-space, K, between the outer and inner walls thereof, and provided with ducts L for conveying the heat to the stack, and ducts M, so located as to draw the heat from the combustion-chamber around the retorts, substantially as described.

T. W. SYNNOTT.

Witnesses:
JOHN A. WIEDERSHEIM,
A. P. GRANT.